United States Patent
Freyman et al.

(10) Patent No.: US 7,073,075 B2
(45) Date of Patent: Jul. 4, 2006

(54) TELEPHONY END USER INTERFACE IN AN HFC ACCESS NETWORK

(75) Inventors: Phillip Kent Freyman, Elgin, IL (US); Roger William Ady, Chicago, IL (US)

(73) Assignee: General Instrument Corporation, Horsham, PA (US)

( * ) Notice: Subject to any disclaimer, the term of this patent is extended or adjusted under 35 U.S.C. 154(b) by 558 days.

(21) Appl. No.: 09/997,103

(22) Filed: Nov. 27, 2001

(65) Prior Publication Data
US 2003/0101373 A1   May 29, 2003

(51) Int. Cl.
*G06F 9/445* (2006.01)
(52) U.S. Cl. ..................... 713/300; 713/340
(58) Field of Classification Search ............... 713/300, 713/340; 708/109; 714/22; 365/229
See application file for complete search history.

(56) References Cited

U.S. PATENT DOCUMENTS

| | | | |
|---|---|---|---|
| 4,868,832 A * | 9/1989 | Marrington et al. | 714/22 |
| 5,414,754 A * | 5/1995 | Pugh et al. | 379/88.23 |
| 5,535,264 A * | 7/1996 | Starr et al. | 379/88.25 |
| 5,889,465 A | 3/1999 | Mercadante et al. | |
| 5,949,974 A * | 9/1999 | Ewing et al. | 709/202 |
| 6,067,030 A | 5/2000 | Burnett et al. | |
| 6,079,026 A | 6/2000 | Berglund et al. | |
| 6,678,528 B1 * | 1/2004 | Clark | 455/461 |

* cited by examiner

*Primary Examiner*—John R. Cottingham
(74) *Attorney, Agent, or Firm*—Benjamin D. Driscoll

(57) ABSTRACT

System (100) and method for providing power supply status indications and network-originated messages on a user device interface (104) of a user device (102) coupled to an access device (110). The access device (110) receives a supply of main power from a main power supply (204), and the access device (110) is adapted to interface with a communications network (111). A backup power supply (206) is coupled to the access device (110) and is adapted to supply backup power to the access device (110) when the supply of main power (214) fails. The backup power supply (206) provides a signal indicating a power condition of the backup power supply (206) when the supply of main power (214) fails. A processor unit (208) receives the signal and generates a backup power supply status indication in response to the signal. At least one user device (102) is coupled to the access device (110) and also is adapted to receive and/or transmit information over the communications network (111) via the access unit (110). The user device (102) receives the backup power supply status indication and the status indication is communicated to a user through a user device interface (104) coupled to the user device (102).

16 Claims, 3 Drawing Sheets

TELEPHONY END USER INTERFACE IN AN HFC ACCESS NETWORK

BACKGROUND OF THE INVENTION

1. Field of the Invention

The present invention generally relates to providing status messages in networks, and more particularly to user notification at end user devices of remote backup power supply indications and subscription service messages.

2. Background of the Invention

Wired access communication networks link multiple remote access devices for delivery of one or more of telephony, data, video programming or other broadband services to end user devices. Commercial utility alternating current (AC) is commonly used to provide a source of power for the remote access devices wired into networks. In a VoIP EMTA (voice-over-Internet protocol embedded-media-terminal-adaptor) communication system, for example, an embedded media terminal adaptor (EMTA) is a broadband telephony interface used to deliver broadband Internet, data, and/or voice access jointly with telephony service to a subscriber's or customer's premises using a cable network infrastructure. The EMTA is normally installed at the customer's or subscriber's premises, and it is coupled to a multiple system operator (MSO) using a HFC (hybrid fiber coax) access network. The EMTA contains a subscriber-side interface to the subscriber's telephone to provide telephony support. For instance, POTS (plain old telephone service) telephone units on a subscriber's premises may be operated through the subscriber's home connectors coupled to the EMTA. This permits subscribers to make and receive regular telephone calls over the HFC network. The EMTA end user communication devices primarily are premises powered at the subscriber's location, and thus the availability and power status of a premises-based power supply is a critical concern in VoIP EMTA-based communication systems, and the like.

Various problems can occur with the supply of power to a remote access device, such as an EMTA, which includes failure of the commercial utility alternating current source providing power to the subscriber's premises. Failure of the commercial alternating current source has been previously addressed by reliance on a shared backup power source located on the premises of the network service provider and monitored and managed by network provider operators. Backup power supplies more recently have been instead provided on the subscriber's premises to form part of the subscriber premises network. Backup power supplies such as backup batteries, however, typically are only able to provide backup power, after failure of the main power supply, for temporary periods of time until their storage of power has been depleted. In the past, backup power supplies have been provided with indicators which indicate the status of the backup power supply. These indicators are important as they inform and alert end users who are using the device receiving power from the backup power supply of the alternating current (AC) power failure event as well as inform users that the backup power supply is approaching the end of its capacity. If adequately and promptly alerted to a primary power supply failure and/or a low power condition of the backup power source, a user can take appropriate action such as placing an emergency call to the network service provider or completing any current ongoing communications in an orderly fashion. The conventional status indicators used for this purpose have drawbacks. Users have been subject to losing the use of remote network devices during main power failure events without any suitable advance warning, an occurrence which often leads to lost work and productivity.

For instance, when remote access devices, such as an EMTA, within a communication network are operating on backup power or low backup power, on account of a main power failure effecting the subscriber premises, the common indication that has been used to inform a user of the situation is a visual indication provided on the access device or its backup power source (e.g., an uninterruptible power source or UPS). Unfortunately, the access device and its backup power source are often not located within the premises at the same location where a user is operating a communication device (e.g., a POTS phone, an integrated services digital network (ISDN) phone, and so forth). This problem is aggravated when the subscriber premises network provides multiple extensions for connecting user devices in different rooms at the same time. As a consequence, the backup power indicator or low backup power indicators often have been hidden or obscured from view from the user or subscriber in previous arrangements. In these prior arrangements, the end user often did not have any indication that the main power had been lost (and thus the backup power was on), or that the backup power may be approaching the end of its capacity.

Thus it can be appreciated that a need has existed for the capability to effectively provide subscribers or users of communication devices wired to a communications network with indications of the backup power supply status for those devices with which the users are interacting. A need also has existed for effectively providing the user a power status indication regardless of the physical relationship between the user device being used (e.g., a phone set) and the access unit (e.g., an EMTA).

DETAILED DESCRIPTION OF AN EMBODIMENT

Figure 1:
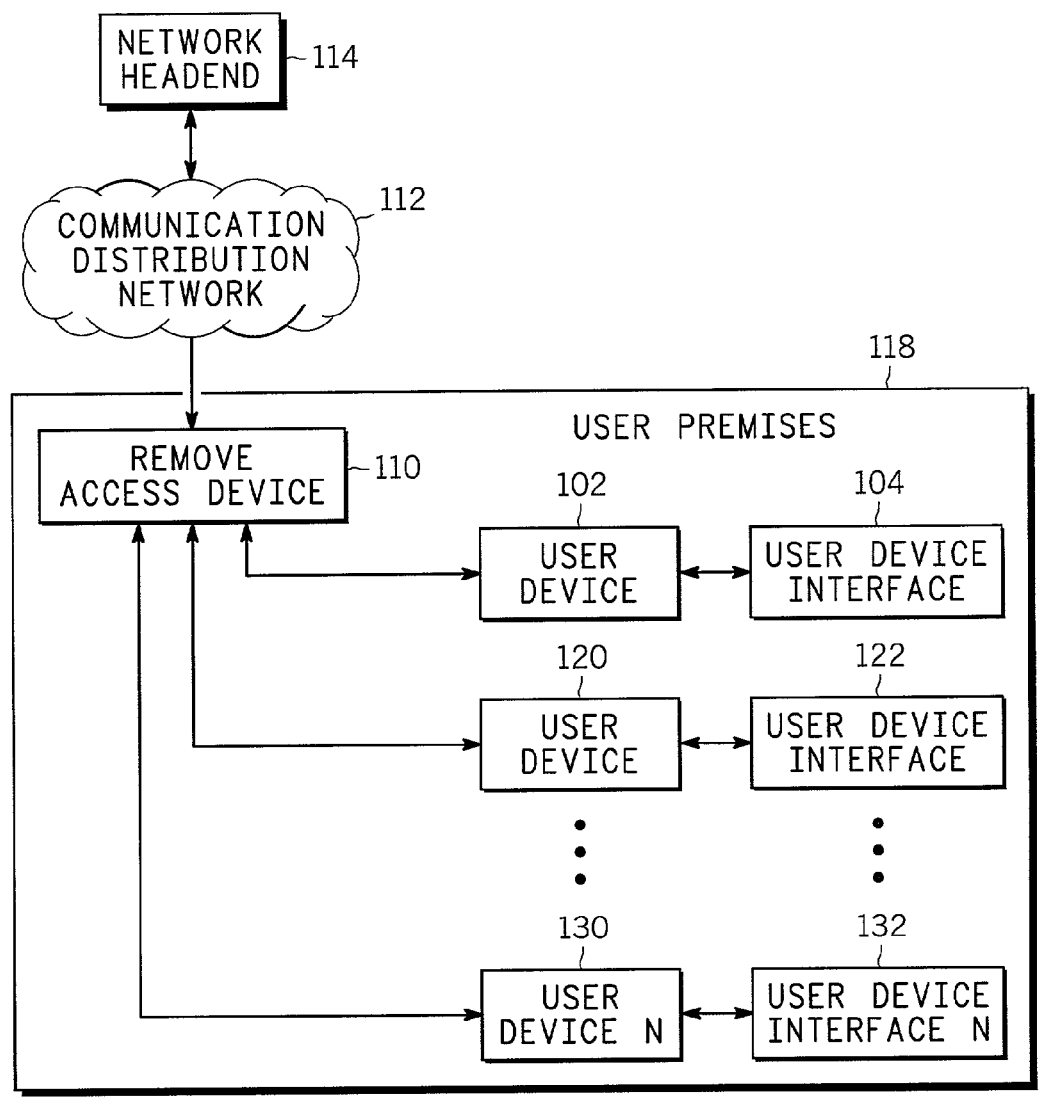
FIG. 1 is a block diagram showing at least one user device accessing a remote access device to form part of user premises network that is coupled into a communications network system.

Regarding FIG. 1, a communications system 100 is shown having a user premises network 118 in which multiple user devices 102, 120, 130, and so forth are accessing a remote access device 110. The access device 110 is coupled to a communication distribution network 112. Additionally, a network headend 114 is coupled to the communications distribution network 112. Remote access device 110 can interact with, and be monitored and controlled by, the network headend 114. In an embodiment, network headend 114 includes an operations and maintenance center (OMC) for control, monitoring, and maintenance of the remote access device 110.

A single user or subscriber premises network 118 is shown to simplify discussion. It will be understood that the communications system 100 typically will have multiple subscriber premises networks coupled into the system. Further to this embodiment, the user premises network 118 is premise powered, such as by commercial AC utility power fed onto the user's premises.

As an illustration, in a VoIP EMTA (voice over Internet protocol embedded media terminal adaptor) communications system as system 100, the network headend 114 includes multiple systems for the management of telephony and video/data transmissions through the system. Further to this illustration, an EMTA, as the remote access device 110, is coupled to the network headend 114 via a HFC (hybrid fiber/coax) access network, and permits multiple users to access Internet protocol (IP) telephony on demand.

The user devices 102, 120, and 130 are coupled to the remote access device 110. It will be appreciated that one or a plurality of user devices can be connected to a common remote access device 110 in a given premises network 118. Moreover, the user devices can be the same or different in terms of their hardware or function. Examples of the user device 102 include, but are not limited to, communication devices such as a telephone, a computer (e.g. a personal computer or PC), an answering machine, or an Internet appliance.

The user devices 102, 120, 130 are shown coupled to user device interfaces 104, 122, 132, respectively. The user device interface 104 interfaces between user device 102 and a user or person (not shown) and facilitates the user in the use of the user device 102. Examples of the user device interface 104 include, but are not limited to, an operating system or any application program having a monitor or other display (these would be typical interfaces for a computer as user device 102).

In operation, a user employs user device 102 to communicate with, or use the services of, remote access device 110 to which it is coupled. The access device 110 couples the user device 102 to the service provider's network and is located outside the service provider's headend 114. Examples of remote access device 110 include, but are not limited to, an EMTA (for voice, video and data broadband delivery to applicable user communication devices); a gateway server, application server, or other server (appropriate for the case of a computer as the user device 102); a cellular telephone access point (for a cellular telephone as the user device 102); or a cable access unit (CAU) (for voice, video and data broadband delivery to applicable user communication devices as the user device 102). Among other things, cable access units (CAUs) separate telephony from video signals on the downstream path and inject telephony signals into the upstream. In the case of an EMTA or a CAU as the remote access device 110, a cable modem (not shown) is included as part of the user premises network to provide high speed connectivity to high speed data access services via a HFC access network. Applicable hardware is included in the EMTA or CAU itself for telephony support (e.g., a POTS line driver and standard threaded connectors). For example, POTS telephone units may be operated through the subscriber's home connectors coupled to access device 110.

Generally, remote access device 110 is physically remote from the user device 102, but this is not mandatory for the practice of the present embodiment. In most cases, however, such remote access devices 110 will not be readily or easily viewable from the location of user device 102. For example, an EMTA or cable access unit may be mounted on the side of a user's residence or placed in an unintrusive place like the basement or attic. A backup battery typically is located with or near the access device. Consequently, a person using a user device 102, such as a phone set, computer, and so forth, will not ordinarily be able to view the access device or the backup battery during a main utility power failure event, such that the person either may not be aware of the main power failure or not know when then backup battery reaches a low charge remaining status.

Figure 2:
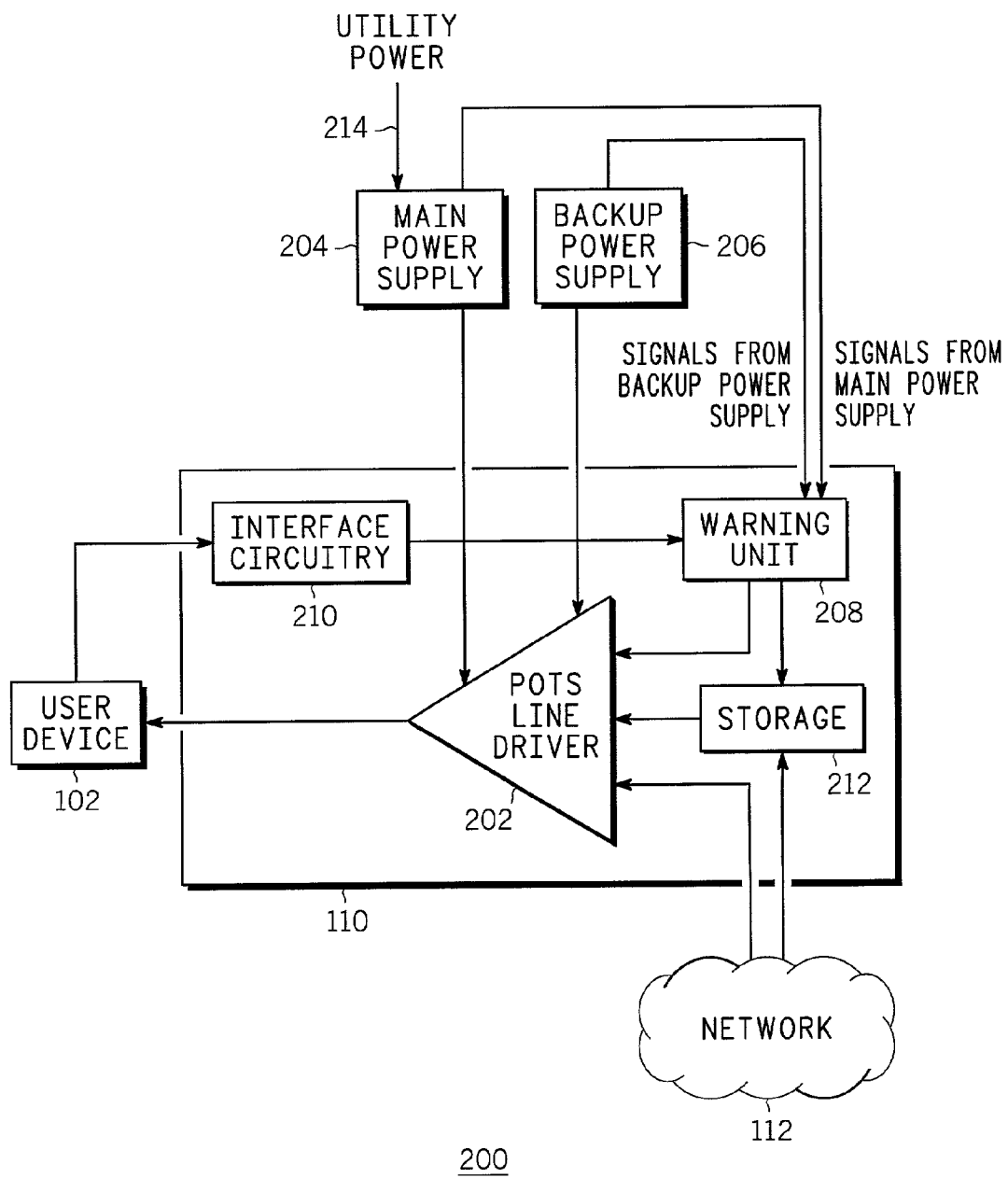
FIG. 2 is a block diagram showing an example of a remote access device 110.

Referring to FIG. 2, an example is shown of a communications system 200 having a remote access device 110.

A network 112, a plain old telephone service line driver 202 (herein referred to as the POTS line driver 202), a user device 102, a main power supply 204, a backup power supply 206, a warning unit 208, interface circuitry 210, and a storage 212 are illustrated in combination. The illustrated access device 110 can be used in a VoIP EMTA system, or other suitable communication systems such as those referenced hereinafter.

By way of an example, a plain old telephone service (POTS) system and the POTS line driver 202 are used. In general, POTS line drivers interface between telephone networks and customer devices. In this example, POTS line driver 202 serves as an interface between the network 112 and the user device 102. In normal operation, the main power supply 204 supplies power to POTS line driver 202. However, in the case of non-normal operation of the main power supply 204, such as alternating current (AC) power failure, the backup power supply 206 supplies the power requirements of the POTS line driver 202. Main power supply 204 and backup power supply 206 each send sensor signals to the warning unit 208 as shown. These signals indicate the status of main power supply 204 and backup power supply 206, respectively.

In an embodiment, the main power supply 204 is an uninterruptible power supply (UPS) including a battery as backup power supply 206 for backup power when alternating current (AC) input power fails. The backup power supply 206 also could be a generator, solar panels, and so forth. Main power supply 204 is supplied utility power 214 from the premises power supply.

In operation, backup power supply 206 supplies power to POTS line driver 202 only when main power supply 204 is unable to do so. The sensor signals provided by backup power supply 206 to warning unit 208 indicate whether or not the backup power supply 206 is supplying power to POTS line driver 202 and its remaining power level or capacity.

In one embodiment, the warning unit 208 is a processor programmed to analyze the status of the two power supplies provided by the status signals and provide warning messages (or warnings) for the end user when it detects certain predetermined events. Warning unit 208 can alternatively be specialized hardware or other circuitry. Examples of predetermined events which warning unit 208 can monitor and generate warnings for include, but are not limited to, the failure of main power supply 204, the beginning of backup power supply 206 to supply compensating power, the capacity of backup power supply 206 reaching a predetermined threshold, or the failure of backup power supply 206. When warning unit 208 detects a predetermined event (e.g. a power supply indication of low capacity), the warning unit 208 generates a predetermined warning message which it sends through POTS line driver 202 to the connected user device 102. This message can be provided in any suitable form such as, but not limited to, audible form (such as a distinctive tone or a spoken message) or visual form (such as flashing lights or a pop-up window for use when the user device is a computer or other computing or electronic device having a screen).

Further to this embodiment, the remote access device 110 detects three conditions: operating from backup power, if the backup power is running low on capacity, and if the backup power is not available (such as a backup battery for backup power supply 206 being dead or disconnected). This detection is then used to generate a Aon-backup@, Alow-power@, or Ano-backup@ tone or voice message which is provided to the user device 102 (such as a phone set). This provides the user with a power status indication regardless of the physical relationship between the remote access device 110 and the phone set. This embodiment includes interfaces that may have multiple phone sets located in different rooms or buildings.

It is noted that in some situations, users may want to avoid having audible warnings. For such situations, in one embodiment, a switch or volume control is used to reduce or cut off the audio component of warnings. Alternatively, a switch (such as implemented by mechanical or software means) can be used to allow the user to select which form of those available (audio, visual, and so forth) a warning can take.

In another embodiment, the warning unit 208 sends warning messages to the customer equipment device(s) which determine for themselves what form the warning is manifested. In this embodiment, the warning messages (also called indicators) are electrically encoded, such as by pulse code modulation (PCM) or digital bits. As discussed previously herein, warnings manifested for a user can be, but are not limited to, acoustical, visual, mechanical, or manifested on other human interface mechanisms. By way of example, a customer equipment device can manifest warnings mechanically by vibration for use by individuals who are visually- and audibly-impaired.

The interface circuitry 210 is coupled to both the user device 102 and the warning unit 208. The interface circuitry 210 in this embodiment provides the warning unit 208 with the electrical signals present at the output of the user device 102. From these electrical signals the warning unit 208 detects when the user device 102 assumes an off-hook state. This detection of the off-hook state of user device 102 is used in conjunction with the storage 212 as described hereafter.

The storage 212 is coupled to both network 112 and POTS line drive 202. Storage 212 is used by network 112 as a repository for voice, tone, or other messages. These messages are therefor available for provision by remote access unit 110 to user device 102 when there is no network connection or when the network connection is not able to be used (such as during periods of high use). In one embodiment, messages supplied by network 112 could include public service announcements, subscription service messages, voice mail messages, and so forth. In this embodiment, the access unit 110 provides these messages to user device 102 responsive to the warning unit 208 detecting, from the output of the interface circuitry 210, that the user device 102 has assumed an off-hook state. In this way, a user receives these public service or voice mail messages and so forth when he or she has caused the user device 102 to go off-hook but before he or she has initiated a desired use of the user device 102.

In another embodiment, the warning unit 208 comprises a processing unit and a digital signal processor (both not shown). In this embodiment, the digital signal processor handles the audio processing of any communication signals from the network 112 as well as the integration of warning messages generated to indicate the status of the power supplies and the integration of messages received from the network and stored in the storage unit 212. The processing unit receives the power supply status signals and provides control signals which tell the digital signal processor to sum in the appropriate warning message to the audio signal which is then provided to the user device 102 by the POTS line driver 202. Similarly, the processing unit monitors the output of the interface circuitry 210 to determine the appropriate time for providing of any stored messages received from the network. The appropriate time for providing stored messages can be, but is not limited to, when the user device 102 goes off-hook. The processing unit then sends control signals to the digital signal processor which, in response, retrieves one or more stored messages and sums them into the audio stream.

Figure 3:
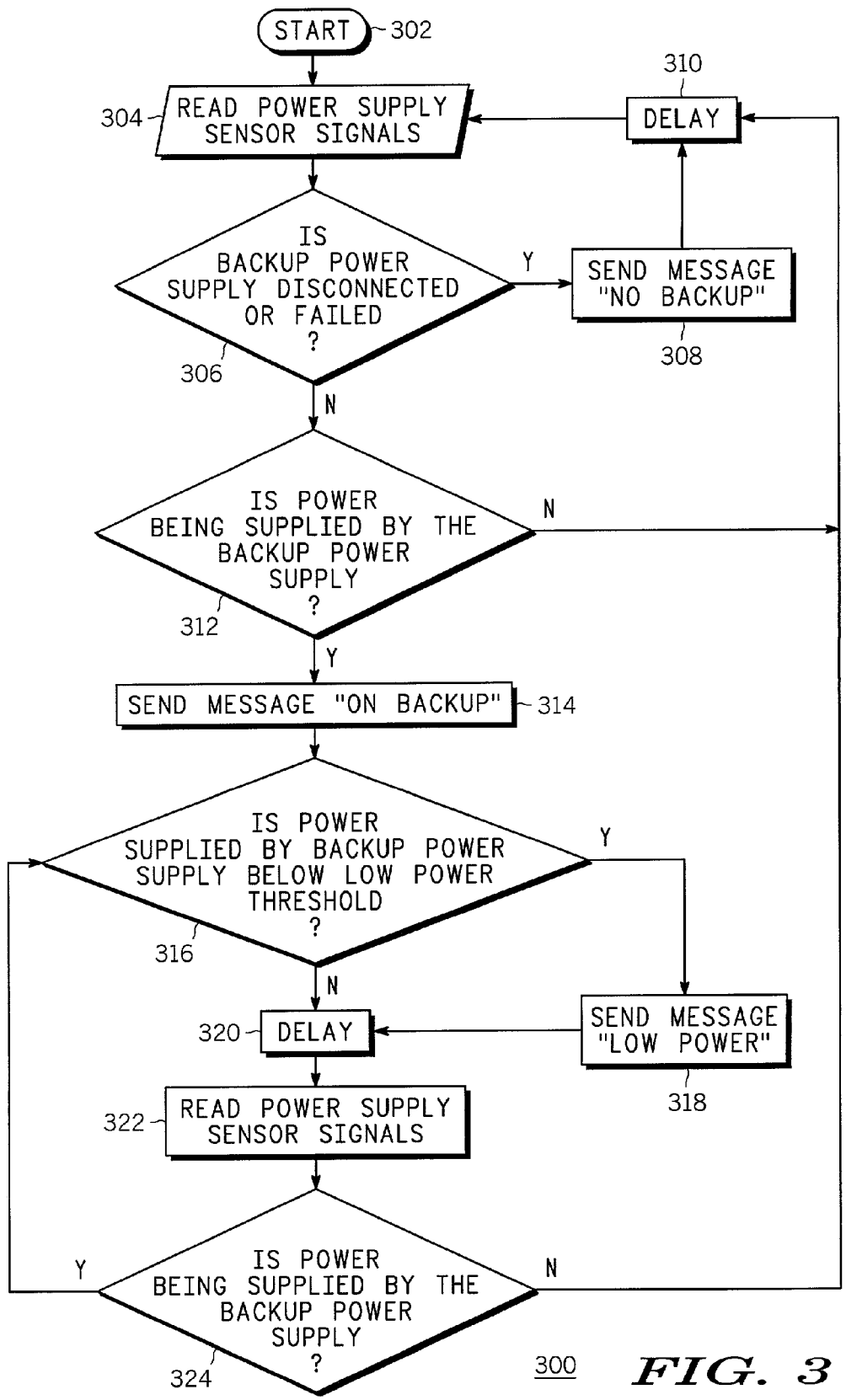
FIG. 3 is a flowchart of an exemplary algorithm for sending warning messages to an end user.

Referring to FIG. 3, shown is an exemplary algorithm 300 for providing warning messages to end user devices. The algorithm 300 executes in a remote access device 110 and starts 302 by reading 304 the power supply sensor signals. These power supply sensor signals provide the status of the main power supply 204 and the backup power supply 206 which are coupled to the remote access device 110. The algorithm 300 checks the power supply status signals to ascertain 306 whether the backup power supply is disconnected, dead, missing, failed, or non-responsive, and if it is, a message (e.g. "No backup") indicating this status is sent 308 to the user device 102 for notification to the user (not shown). The message generated can be any signal, communication, or other message appropriate to the system of which the remote access device 110 is a part. For example, in a plain old telephone service (POTS) system, one embodiment for the warning message generated is a prerecorded voice message, or alternatively, a distinctive tone or tone melody. Thereafter, algorithm 300 delays 310 for a period of time before returning to again read 304 the power supply statuses and continue as before.

If, however, the backup power supply is present and responsive (i.e. not missing or dead), the algorithm 300 checks 312 whether the backup power supply 206 is reported as providing power to the remote access unit 110. The backup power supply 206 will only actively provide power when main power supply 204 is unable to do so. If the backup power supply 206 is not providing power, however, the algorithm 300 delays 310 for a time period and then reads 304 the power supply statuses and continues as before.

If, however, the backup power supply 206 is providing power to the remote access device 110, a message (e.g. "on-backup") is sent 314 by the algorithm 300 to the user device 102 for notification to the user. The algorithm 300 then checks 316 the level of the reserve capacity of the backup power supply 206. In this embodiment, the reserve capacity condition of the backup power supply 206 is sent as part of the status sent by backup power supply 206 to warning unit 208. Backup power supplies such as batteries only have a finite reserve of power and eventually will drain when used if not replenished. This reserve capacity is compared against a predetermined level or threshold, and if the reserve capacity is below the threshold, the reserve capacity is considered to be in a low power state. If the status signal indicates a low power state, a message (e.g. "low power") is sent 318 to the user device 102. The "low power" message is designed to give the user a warning that a limited time remains for operation. Thereafter, the algorithm 300 delays 320 for some period of time, reads again 322 the power supply sensor signals to get a new power supply status update and checks 324 if the backup power supply 206 is continuing to supply power to the remote access unit 110, and if so, the algorithm 300 returns to check 316 the reserve capacity and continues as illustrated before. If, however, the main power supply 204 has resumed the supply of power, then the algorithm 300 delays 310 by a time period and returns to read 304 the power supply sensor signals and continues as discussed previously herein.

The present invention permits a user to take appropriate action in the event of a primary power failure such as a blackout. For example, the user is effectively alerted to the situation in an effective manner in real time so that appropriate action can be taken, such as placing an emergency call or calls, or completing any unfinished ongoing activity, such as a communications session, in an orderly manner.

A plain old telephone system (POTS) is used herein by way of a non-limiting example. For example, the present invention is generally applicable to communication systems combining broadband video/data transmission with telephony services such as, but not limited to, voice over internet protocol (VOIP) embedded media terminal adaptor (EMTA), wireless linked loop (WLL), fiber to the home (FTTH), telephony remote terminals, platforms on which broadband operators can deliver voice, data, and/or video over a common hybrid fiber/coax (HFC) network such as Motorola=s cablecomm system, integrated services digital network (ISDN) embedded media terminal adaptor (EMTA), data over cable service interface specification (DOCSIS), European DOCSIS (EuroDOCSIS), or digital video broadcasting (DVB).

The present invention can be generally applied in any communications or computer network or system in which a backup power supply is provided for premises powered networks coupled to communication networks. Additionally, the algorithms of the present invention may be implemented in hardware-only configurations and in hardware plus software configurations.

The present invention has been described in terms of preferred embodiments, however, it is understood that numerous additional advantages and modifications will readily occur to those skilled in the art. Therefore, the invention in its broader aspects is not limited to the specific details and representative embodiments shown and described herein. Accordingly, various modifications may be made of the general inventive concept without departing from the spirit or scope of the appended claims and their equivalents.

What is claimed is:

1. An access device for providing messages to a user device comprising:
    a network interface unit having an interface to receive network communications signals and a signal output to provide a first communications signal;
    interface circuitry having an input to receive user device communications signals and an output to provide a second communications signal;
    a processing unit having a first input coupled to said interface circuitry output. a second input to receive power supply status signals, a storage output to provide control signals and a second output to provide a power supply status indication;
    a storage unit having a first input coupled to said network interface unit signal output to receive network-originated messages, said storage unit having a second input coupled to said processing unit storage output to receive said control signals, said storage unit having an output to provide received messages; and
    a line driver having a first input coupled to said network interface unit signal output and a second input coupled to said storage unit output, a third input coupled to said second output of said processing unit, said line driver having a drive output to provide said first communications signal, said received messages and said power supply status indication.

2. An access device as in claim 1, wherein said storage unit output provides at least one received message responsive to a user device assuming an off-hook state.

3. An access device as in claim 2, wherein at least one of said received messages comprises at least one of a public announcement, a weather announcement, a subscription service message, a voice mail message, and a warning message.

4. An access device as in claim 2, wherein at least one of said received messages comprises at least one of a tone and a melody.

5. An access device as in claim 2, wherein the access device is an EMTA.

6. An access device as in claim 2, wherein the access device is a cable access unit.

7. A system for providing a backup power supply status indication to a user device, comprising:
    a line driver having a power input to receive power and a network interface to receive communications signals from a communications network;
    a backup power supply having a power output coupled to said line driver power input, said backup power supply adapted to supply backup power to said line driver when the supply of main power fails, said backup power supply having a status output to provide a signal indicating a power condition of said backup power supply;
    a processor unit having a first input coupled to said backup power supply status output, said processor unit having a first output to provide a backup power supply status indication in response to said signal, said processor unit first output coupled to a second input of said line driver;
    a storage unit having a first input to receive messages from said communications network, said storage unit having an output coupled to a third input of said line driver to provide a received message; and
    at least one user device having an input coupled to a drive output of said line driver to receive at least one of the backup power supply status indication and one or more of said received messages.

8. A system as in claim 7, further comprising:
    interface circuitry having an input coupled to an output of said at least one user device, said interface circuitry having an output to provide an indication that a user device has assumed an off-hook state, said interface circuitry output coupled to a second input of said processing circuitry, said processing circuitry having a second output coupled to a second input of said storage unit to provide a control signal, at least one of said received messages provided by said storage unit output in response to said control signal.

9. A system as in claim 8, wherein the backup power supply status indication comprises an indication that the backup power supply is on.

10. A system as in claim 8, wherein the backup power supply status indication comprises a voice message indicating the power condition of said backup power supply status.

11. A system as in claim 8, wherein the backup power supply status indication comprises an audible sound associated with the power condition of said backup power supply status.

12. A system as in claim 8, wherein the line driver and processing unit are contained in an EMTA.

13. A system as in claim 8, wherein the line driver and processing unit are contained in a cable access unit.

14. A system as in claim 8, wherein the user device is selected from a phone set, a computer, an answering machine, a facsimile machine, and a television.

15. A system as in claim 8, wherein a plurality of user devices are coupled to the access device.

16. A system as in claim 7 wherein the backup power supply status indication indicates that the backup power supply is low on power capacity.

* * * * *